United States Patent
King et al.

[19]

[11] Patent Number: 6,088,912
[45] Date of Patent: Jul. 18, 2000

[54] SELF-ALIGNING SLIDER AND PLATFORM CLAMPING SYSTEM FOR MANUFACTURING INTEGRATED LEAD SUSPENSIONS

[75] Inventors: Edward Kou-Wei King, Fremont; Darrick Taylor Smith, San Jose, both of Calif.; Steven Harry Voss, Rochester, Minn.

[73] Assignee: International Business Machines Corporation, Armonk, N.Y.

[21] Appl. No.: 09/109,023

[22] Filed: Jul. 1, 1998

[51] Int. Cl.[7] .................................................. B23P 19/00
[52] U.S. Cl. .......................... 29/759; 29/465; 29/603.03
[58] Field of Search ............................. 29/759, 760, 737, 29/603.03, 603.06, 603.04, 603.07, 603.12, 465, 466; 156/556

[56] References Cited

U.S. PATENT DOCUMENTS

| | | |
|---|---|---|
| 4,391,035 | 7/1983 | Van De Bult ........................ 29/603.06 |
| 4,520,555 | 6/1985 | Gyi et al. ............................. 29/603.06 |
| 4,555,840 | 12/1985 | Nakamura ................................. 29/465 |
| 4,964,941 | 10/1990 | Von Brandt et al. ...................... 29/759 |
| 5,732,459 | 3/1998 | Shiraishi et al. .......................... 29/760 |

*Primary Examiner*—Lee Young
*Assistant Examiner*—A. Dexter Tugbang
*Attorney, Agent, or Firm*—Douglas R. Millett; Felsman, Bradley, Vaden, Gunter & Dillion, LLP

[57] ABSTRACT

A clamp assembly holds an integrated lead suspension during assembly. The clamp assembly has a number of features for precisely positioning the integrated lead suspension while transducer heads are being mechanically and electrically connected to it. The clamp assembly works in conjunction with a stationary platform which restricts movement of the suspension in three directions. The clamp assembly includes upper and lower support plates which compensate for lateral misalignment, and a pair of clamps which independently isolate the suspension and slider while compensating for rotational misalignment.

13 Claims, 5 Drawing Sheets

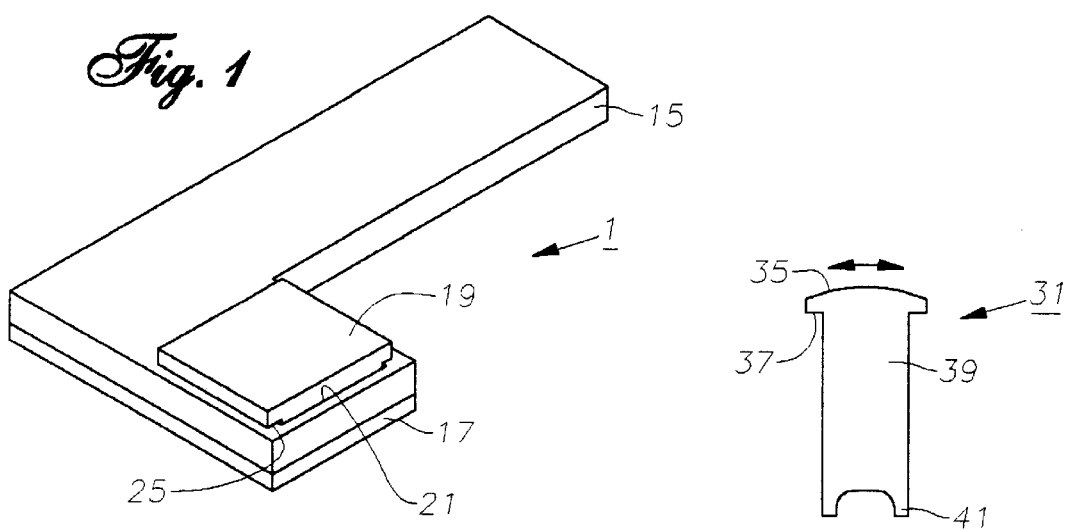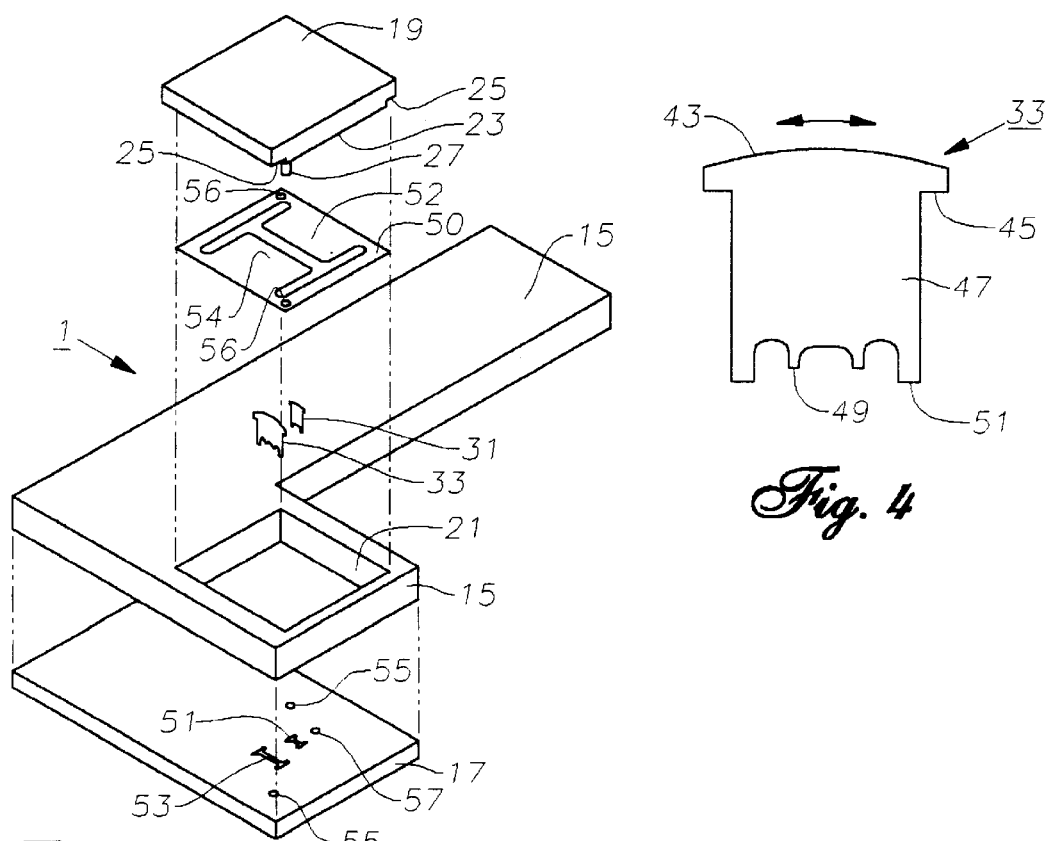

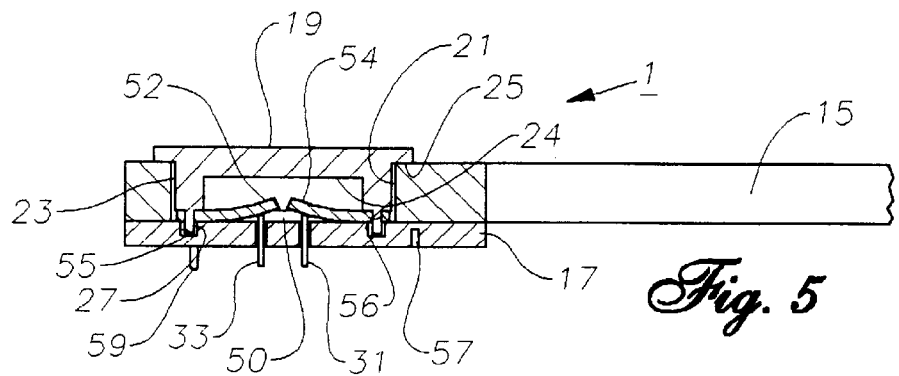
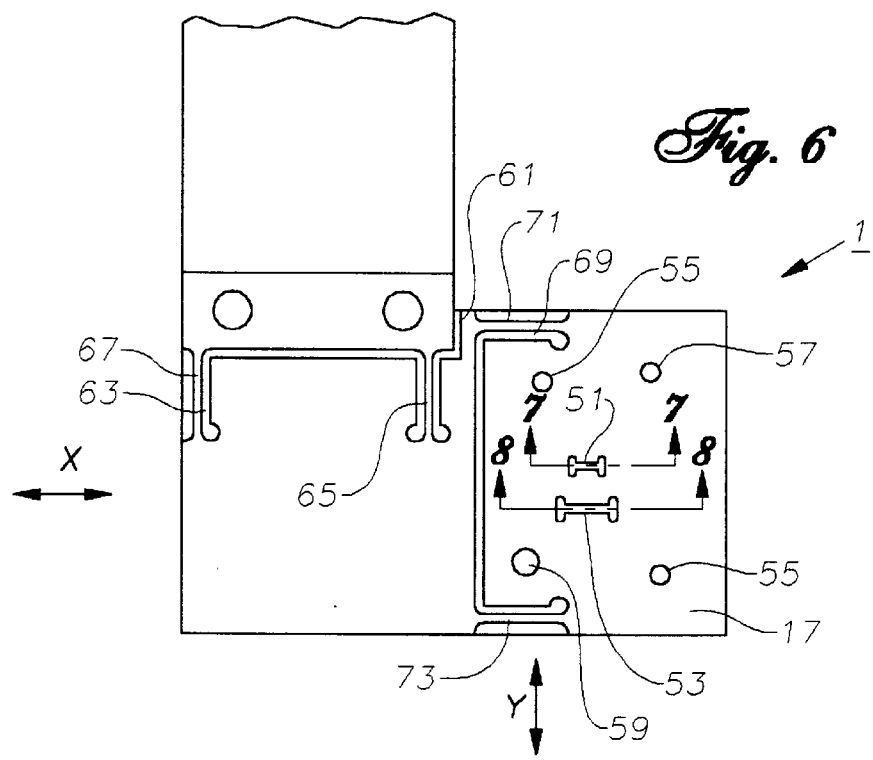
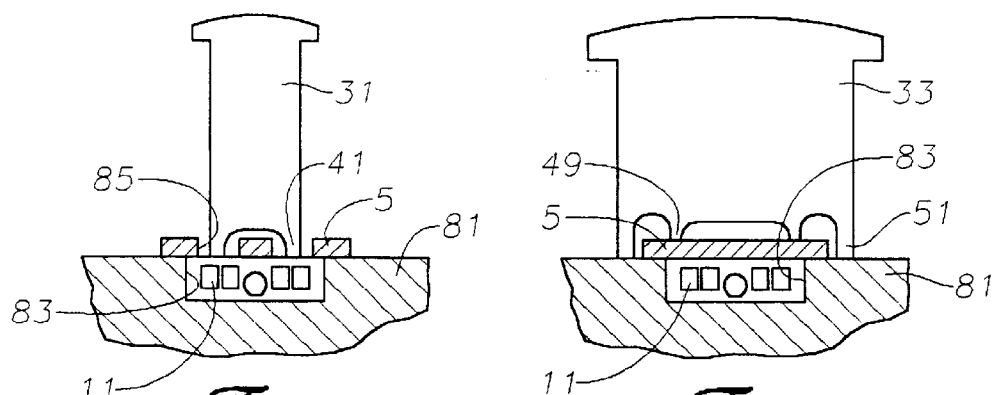

SELF-ALIGNING SLIDER AND PLATFORM CLAMPING SYSTEM FOR MANUFACTURING INTEGRATED LEAD SUSPENSIONS

TECHNICAL FIELD

This invention relates in general to tool blocks and in particular to a tool block for assembling transducer heads to an integrated lead suspension.

BACKGROUND ART

Integrated lead suspensions (ILS) for computer hard disk drive head gimbal assemblies were recently introduced. The ILS differs from prior art suspension designs as it has electrical leads which are an integral part of the suspension. The integrated leads of the ILS are typically connected to the suspension by an ultrasonic bonding process. Integrated leads allow the assembly to have smaller suspension geometries than its predecessors. One problem encountered with the ILS during manufacturing is that the smaller geometries require very precise positioning of the suspension and the transducer heads when they are mechanically and electrically connected during assembly. A method and apparatus for precision assembly of the ILS is needed.

DISCLOSURE OF THE INVENTION

A tool block holds an integrated lead suspension during assembly. The tool block has a number of features for precisely positioning the integrated lead suspension while transducer heads are being mechanically and electrically connected to it. The tool block works in conjunction with a stationary platform which restricts movement of the suspension in three directions. The tool block includes upper and lower support plates which compensate for lateral misalignment, and a pair of clamps which independently isolate the suspension and slider while compensating for rotational misalignment.

BRIEF DESCRIPTION OF THE DRAWINGS

FIG. 1 is an isometric view of a tool block assembly constructed in accordance with the invention.

FIG. 2 is an exploded, isometric view of the tool block assembly of FIG. 1.

FIG. 3 is front view of a slider clamp of the tool block assembly of FIG. 1.

FIG. 4 is front view of a platform clamp of the tool block assembly of FIG. 1.

FIG. 5 is a sectional side view of the tool block assembly of FIG. 1.

FIG. 6 is a bottom view of a bottom plate of the tool block assembly of FIG. 1.

FIG. 7 is a sectional front view of the tool block assembly of FIG. 1 in operation and taken along the line 7—7 of FIG. 6.

FIG. 8 is a sectional front view of the tool block assembly of FIG. 1 in operation and taken along the line 8—8 of FIG. 6.

BEST MODE FOR CARRYING OUT THE INVENTION

Figure 9:
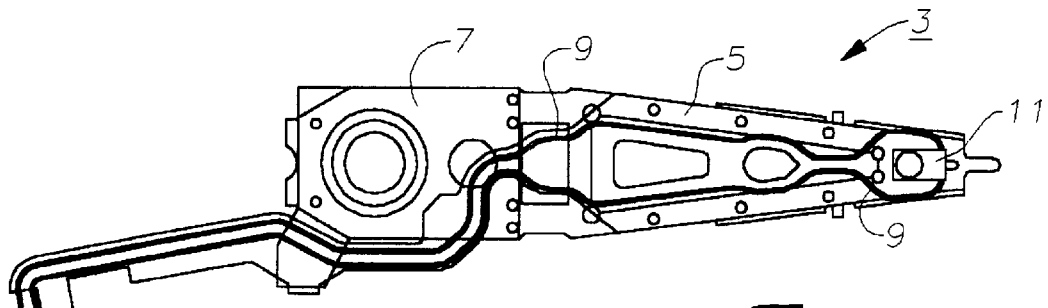
FIG. 9 is a plan view of an integrated lead suspension.

Referring to FIG. 1, tool block assembly 1 for assembling an integrated lead suspension assembly 3 (FIG. 9) is shown. Suspension assembly 3 comprises a cantilevered suspension 5 secured to and extending from a suspension platform 7. Suspension assembly 3 also has a plurality of integrated electrical leads 9 which are ultrasonically bonded to transducer heads or sliders 11 during assembly.

Assembly 1 comprises an L-shaped top plate 15, a bottom plate 17 which mates with and secures to one rectangular portion of top plate 15, and a backing plate 19. Top plate 15, bottom plate 17 and backing plate 19 are secured to one another with fasteners (not shown). As shown in FIGS. 1 and 2, backing plate 19 has a flat, T-shaped cross-section with a rectangular protrusion 23 which defines a shoulder 25 on either side. A rectangular recess 24 is located within protrusion 23 (FIG. 5). Top plate 15 has a rectangular through-hole 21 near one end. Hole 21 closely receives protrusion 23 so that shoulders 25 land on the upper surface of top plate 15. Backing plate 19 also has a pair of locating pins 27 which extend downward from diagonal corners of protrusion 23.

Referring to FIGS. 2–4, assembly 1 also comprises a slider clamp 31 and a platform clamp 33. Clamps 31, 33 are flat, generally T-shaped and approximately the same length. However, clamp 33 is much wider than clamp 31. Clamp 31 has an arcuate head portion 35 which defines a pair of downward-facing shoulders 37 on either side of an elongate body 39. A pair of clamping points 41 extend downward for a short distance from the lower end of body 39. Clamp 33 is very similar to clamp 31 and has an arcuate head portion 43, a pair of shoulders 45, a body 47 and a pair of clamping points 49. Arcuate head portions 35, 43 are provided for helping clamps 31, 33, respectively, align during assembly. Clamp 33 also has a pair of registration points 51 which are located outside of clamping points 49. Registration points 51 are slightly wider and longer than clamping points 49.

As shown in FIG. 2, assembly 1 also has a thin leaf spring 50 with an H-shaped hole which defines spring tabs 52, 54. Spring 50 is located between protrusion 23 and bottom plate 17. Tabs 53, 54 are designed to deflect independently. Spring 50 has a hole 56 in two of its corners for accommodating locating pins 27 on backing plate 19.

As shown in FIGS. 2, 5 and 6, bottom plate 17 contains several other important features. A slider clamp slot 51 is provided in bottom plate 17 for slider clamp 31, and a platform clamp slot 53 is provided in bottom plate 17 for platform clamp 33. Slots 51, 53 are generally I-shaped and carefully dimensioned to closely receive their respective clamps 31, 33. Slots 51, 53 have widths which are greater than the widths of bodies 39, 47, respectively, but less than the widths of head portions 35, 43. Slots 51, 53 are also parallel to one another, closely spaced from each other, and orthogonal to the edges of bottom plate 17.

Bottom plate 17 also has several locating features for proper alignment during assembly. A pair of locating holes 55 in bottom plate 17 located on opposite corners of slots 51, 53. Locating holes 55 are provided for receiving locating pins 27 on backing plate 19. An alignment through-hole 57 is located near slots 51, 53 and a lateral edge of bottom plate 17. In addition, a registration pin 59 extends downward from bottom plate 17. Registration pin 59 is positioned opposite hole 57 with slots 51, 53 located therebetween.

Referring now to FIG. 6, bottom plate 17 has slots 61, 63 and 69 for compliance movement in translational directions. Slots 61, 63, 69 are preferably formed by wire electronic discharge machining. Slots 61, 63 are carefully positioned near the junction where bottom plate 17 attaches to top plate 15. Slot 61 is orthogonal and extends in the y-direction while slot 63 is U-shaped and extends in both x and y directions. Slots 61, 63 define very narrow walls 65, 67 between themselves and the outer surfaces of bottom plate 17. Another U-shaped, milled through-slot 69 is located near the opposite end of bottom plate 17 and is oriented perpendicular to slot 63. Slot 69 defines two very narrow walls 71, 73 between itself and the outer surfaces of bottom plate 17. When bottom plate 17 is rigidly secured to top plate 15, slots 61, 63 and thin walls 65, 67 will still allow bottom plate 17 to have a very limited range of motion in the x-direction during assembly without imparting unwanted bending. Similarly, slot 69 and thin walls 71, 73 will still allow bottom plate 17 to have a very limited range of motion in the y-direction during assembly without imparting unwanted bending.

In operation (FIGS. 7 and 8), assembly 1 is used in conjunction with a conventional platform support or tool block base 81 having a slider nest or recess 83. Prior to processing, a set of sliders 11 are placed in recess 83, and suspension assembly 3 is carefully positioned adjacent to sliders 11 on base 81. Recess 83 supports sliders 11 on at least three orthogonal surfaces to ensure that they are precisely positioned both in terms of linear and rotational orientations. Assembly 1 (FIG. 1) is then lowered on top of base 81. In the preferred embodiment, base 81 may be brought into contact with assembly 1 which remains stationary and passive. Assembly 1 and base 81 make contact when hole 57 and pin 59 on bottom plate 17 engage a pin and hole (not shown) on tool block base 81. Pin 59 assures precise positioning between the tool and part.

As assembly 1 continues to move toward base 81, clamps 31, 33 engage suspension assembly 3. As shown in FIG. 8, cantilevered suspension 5 is held against base 81 by clamping points 49 of clamp 33 while registration points 51 contact the surface of base 81. Referring to FIG. 7, suspension 5 has openings 85 which allow clamping points 41 of clamp 31 to directly contact sliders 11 without touching suspension 5 as sliders 11 sit in recess 83. As shown in FIG. 5, clamps 31, 33 are allowed to recede slightly into recess 24 in backing plate 19 when contact is made. Clamping sliders 11 and limiting movement of suspension assembly 3 are critical steps to maintain the natural state of suspension 5. Excessive movement of suspension 5 or large displacement from its natural state will result in large deviation from nominal pitch and row static attitudes. These requirements are especially critical in ultrasonic bent lead termination processes. In an alternate embodiment (not shown), an additional crab leg configuration may be used to clamp the slider from below as well as above.

Once suspension 5 and sliders 11 are properly clamped against tool block 81 by assembly 1, they are ultrasonically welded to one another to establish mechanical fastening and electrical connection. The welded slider and suspension assembly (not shown) is then removed and the process is repeated.

Some systems have inherent variability in the components, such as a manufacturing line using conveyors and multiple tool blocks. In these systems, the components need to self-align with the components prior to assembly to ensure that clamps 31, 33 engage in the proper locations and orientation for proper operation and to avoid damages to the integrated lead suspensions 3. The independent leaf springs 52, 54 compensate for any rotational misalignment between assembly 1 and base 81 upon engagement. Head portions 35, 43 of clamps 31, 33 are curved so that they can rock and slightly pivot against leaf springs 52, 54, respectively, and thereby compensate for any rotational misalignment in assembly 1 upon engagement. Recess 24 receives leaf springs 52, 54 and head portions 35, 43 when clamps 31, 33 are in use.

To compensate for translational misalignment, slots 61, 63 and 69 act as parallel rotating bars in a four-bar-linkage configuration. The two sets of bars are orthogonal to one another to produce independent orthogonal motions of bottom plate 17 in x and y planes without rotation. Backing plate 19 is sized to limit the range of travel of the rotating parallel bars in bottom plate 17.

Figure 10:
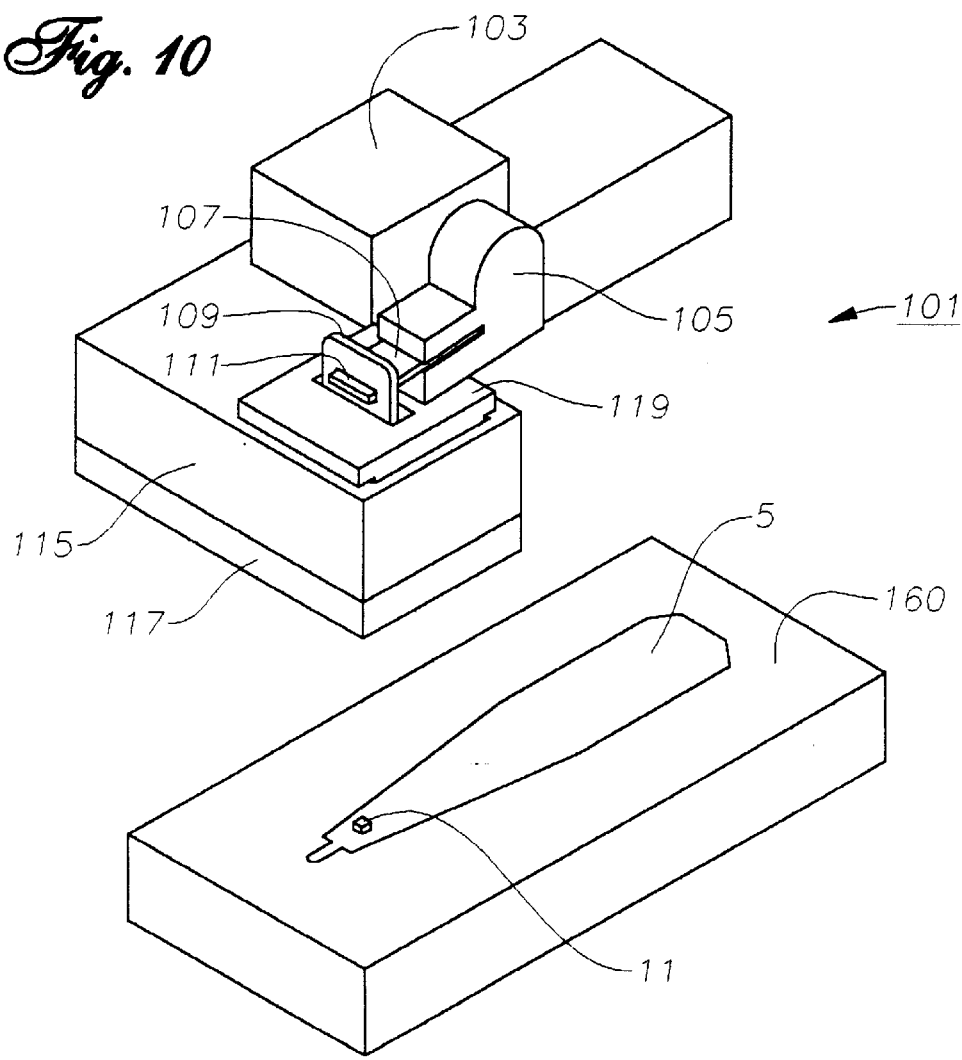
FIG. 10 is a schematic isometric view of a second embodiment of the tool block assembly of FIG. 1.
Figure 11:
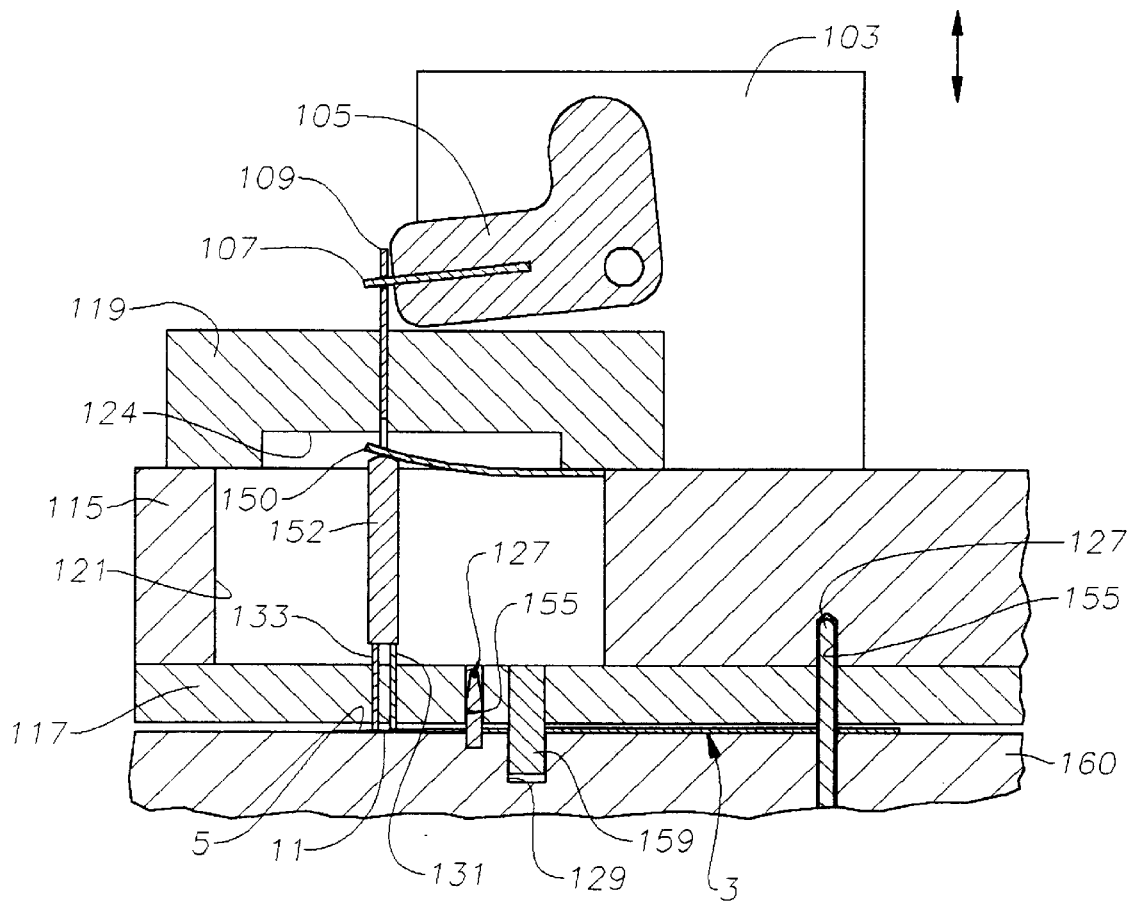
FIG. 11 is a sectional side view of the tool block assembly of FIG. 10.

Referring now to FIGS. 10 and 11, a second embodiment of the invention is shown. Assembly 101 is similar to assembly 1, but is actuated in a different manner. Assembly 101 comprises an actuator 103 having an internal cam (not shown) which drives an arm 105. One end of a rectangular leaf spring 107 is attached to and extends from arm 105. The other end of spring 107 is secured to an upside-down, U-shaped crab leg clamp 109. Spring 107 extends through a slot 111 in crab leg clamp 109 which will be more fully described below. Like assembly 1, assembly 101 also has an L-shaped top plate 115 with a through-hole 121, a bottom plate 117, and a backing plate 119 which are secured to one another with fasteners (not shown) in the same manner as described above. A rectangular recess 124 is located within backing plate 119 (FIG. 12).

Assembly 101 also comprises a slider clamp 131 and a platform clamp 133 (FIG. 14) which are identical to those described above. Clamps 131, 133 have arcuate head portions 134, 136 and clamping points 138, 140, respectively.

Figure 12:
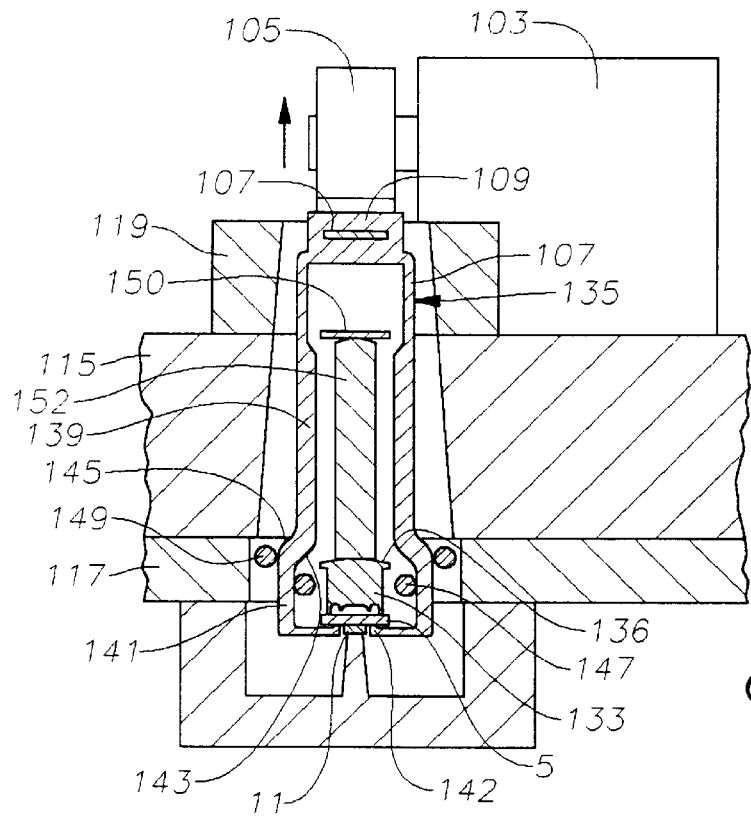
FIG. 12 is a sectional front view of the tool block assembly of FIG. 10 having a crab leg clamp in an engaged position.

As shown in FIGS. 11 and 12, assembly 101 has a second leaf spring 150 which is located between backing plate 119 and bottom plate 117. Spring 150 is designed to engage the upper end of a pin 152. The lower end of pin 152 is in contact with head portions 134, 136 of clamps 131, 133, respectively. Spring 150 biases clamps 131, 133 in a downward direction.

Figure 13:
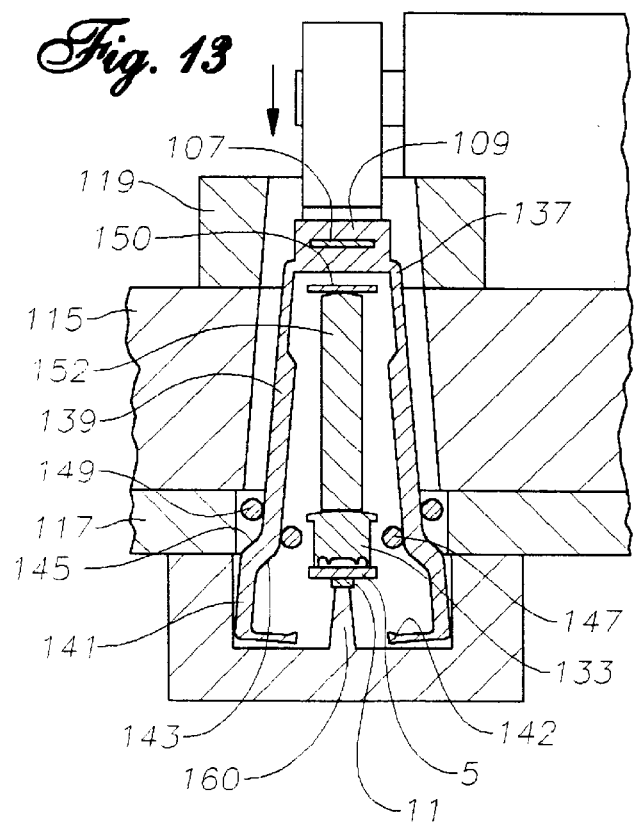
FIG. 13 is a partial front view of the tool block assembly of FIG. 10 with the crab leg clamp in a disengaged position.

Crab leg clamp 109 is designed to support an integrated lead suspension assembly 3 (FIG. 9) during processing. As shown in FIGS. 12 and 13, clamp 109 has a pair of symmetrical legs 135 which extend downward from spring 107. Each leg 135 may be divided into several sections. A narrow upper portion 137 transitions and flares inward into a wider medial portion 139. Medial portions 139 flare outward and transition into lower portions 141. A finger 142 extends orthogonally inward from each lower portion 141. Lower portions 141 have inner cam surfaces 143 and outer cam surfaces 145. Clamp 109 extends through backing plate 119, upper plate 115 and lower plate 117. A set of inner pins 147 are provided at the lower end of lower plate 117. Inner pins 147 are provided for engaging inner cam surfaces 143. A set of outer pins 149 are provided at the upper end of lower plate 117. Outer pins 149 are provided for engaging outer cam surfaces 145. Outer pins 149 are located above and slightly wider apart than inner pins 147.

Like bottom plate 17, bottom plate 117 of assembly 101 also contains a number of slots which compensate for translational movement. The slots in bottom plate 117 are identical to those described above for FIG. 6. Bottom plate 117 also has several locating features for proper alignment during assembly. Locating holes 155 and locating pins 159 are provided for receiving locating pins 127 and holes 129 on a tool block base 160.

In operation (FIGS. 11–14) assembly 101 is used in conjunction with tool block base 160. Prior to processing, a set of sliders 11 and suspension assembly 3 are carefully positioned on tool base 160. Tool base 160 supports sliders 11 on at least three orthogonal surfaces to ensure that they are precisely positioned both in terms of linear and rotational orientations. Assembly 101 (FIG. 10) is then lowered on top of tool base 160. In the preferred embodiment, tool base 160 may be brought into contact with assembly 101 which remains stationary. Assembly 101 and base 160 make contact when holes 129, 155 and pins 159, 127 engage. Pin 159 assures precise positioning between the tool and part.

As assembly 101 continues to move toward base 160, crab leg clamp 109 is moved to the disengaged position (FIG. 13) by arm 105 so that fingers 142 do not contact suspension assembly 3. In the disengaged position, inner pins 147 engage cam surfaces 143, thereby forcing fingers 142 apart. Outer pins 149 do not touch cam surfaces 145 in the disengaged position. In addition, crab leg clamp 109 never contacts spring 150, pin 152 or clamps 131, 133.

Figure 14:
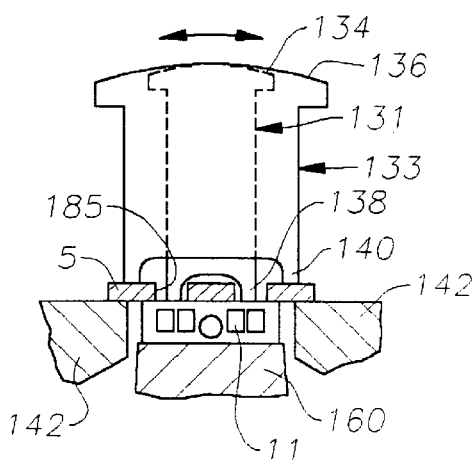
FIG. 14 is an enlarged front view of suspension and slider clamps during operation.

As shown in FIGS. 13 and 14, cantilevered suspension 5 is held against base 160 by clamping points 140 of clamp 133. Suspension 5 has openings 185 which allow clamping points 138 of clamp 131 to directly contact sliders 11 without touching suspension 5. As shown in FIG. 11, clamps 131, 133 force pin 152 to lift spring 150 slightly when contact is made. Next, crab leg clamp 109 is moved to the engaged position (FIGS. 12 and 14) by arm 105. As clamp 109 is moved upward, outer cam surfaces 145 engage outer pins 149 to force fingers 142 inward until they engage an underside of suspension platform 7. The clamping force on crab leg clamp 109 is lower than that of clamps 131, 133, so that their position will not be misaligned during operation. This achieves the goal of adjusting the clamping height of the platform to the individual slider 11 height. Spring 150 ensures that fingers 142 push up only at the designed force regardless of input pressure at actuator 103.

Limiting movement of suspension assembly 3 is critical to maintain the natural state of suspension 5. Excessive movement of suspension 5 or large displacement from its natural state will result in large deviation from nominal pitch and row static attitudes. This requirement is especially critical in ultrasonic bent lead termination processes.

Once suspension 5 and sliders 11 are properly clamped against tool block base 160 by assembly 101, they are ultrasonically welded to one another to establish mechanical fastening and electrical connection. The welded slider and suspension assembly (not shown) is then removed and the process is repeated.

As mentioned above, some systems have inherent variability in the components, such as a manufacturing line using conveyors and multiple tool blocks. In these systems, the components need to self-align with the components prior to assembly to ensure that clamps 131, 133 engage in the proper locations and orientation for proper operation and to avoid damages to the integrated lead suspensions 3. Head portions 134, 136 bump against pin 152 and, thus, spring 150 to compensate for any rotational misalignment. To compensate for translational misalignment, the previously mentioned slots (not shown, but identical to those of FIG. 6) act as parallel rotating bars in a four-bar-linkage configuration. The two sets of bars are orthogonal to one another to produce independent orthogonal motions of bottom plate 117 in x and y planes without rotation. Backing plate 119 is sized to limit the range of travel of the rotating parallel bars in bottom plate 117.

The invention has several advantages. The tool block assembly very precisely retains integrated lead suspensions during processing. The assembly is self-compensating in both rotational and translational alignments and individually clamps the suspension arm and slider components. Clamp wear can be monitored automatically when combined with an alignment vision system. The consumable parts are also inexpensive and easily replaced.

While the invention has been shown or described in only some of its forms, it should be apparent to those skilled in the art that it is not so limited, but is susceptible to various changes without departing from the scope of the invention.

We claim:

1. An apparatus for processing an integrated lead suspension assembly having a suspension body and a slider, comprising:

a tool block base having a platform which is adapted to support the suspension body and the slider;

a tool block assembly;

a suspension body clamp movably mounted in the tool block assembly for retaining the suspension body when the tool block assembly comes into contact with the tool block base, the suspension body clamp being a flat member with a pair of clamping points on one end which are adapted to contact the suspension body;

a slider clamp movably mounted in the tool block assembly for retaining the slider when the tool block assembly comes into contact with the tool block base, the slider clamp being a flat member with a pair of clamping points on one end which are adapted to contact the slider; and wherein the tool block assembly further comprises:

a top plate having a cavity;

a bottom plate mound to the top plate and having a pair of slots for receiving the slider clamp and the suspension body clamp; and a backing plate mounted to the bottom plate for sealing the cavity in the top plate.

2. An apparatus for processing an integrated lead suspension assembly having a suspension body and a slider, comprising:

a tool block base having a platform which is adapted to support the suspension body and the slider;

a tool block assembly;

a suspension body clamp movably mounted in the tool block assembly for retaining the suspension body when the tool block assembly comes into contact with the tool block base, the suspension body clamp being a flat member with a pair of clamping points on one end which are adapted to contact the suspension body;

a slider clamp movably mounted in the tool block assembly for retaining the slider when the tool block assembly comes into contact with the tool block base, the slider clamp being a flat member with a pair of clamping points on one end which are adapted to contact the slider; and wherein the slider clamp and the suspension body clamp each have an arcuate head portion to compensate for rotational misalignment between the tool block assembly and the tool block base.

3. An apparatus for processing an integrated lead suspension assembly having a suspension body and a slider, comprising:

a base having a platform and a recess which are adapted to support and receive the suspension body and the slider, respectively;

a tool block assembly having a bottom plate with a pair of slots;

a suspension body clamp movably mounted one of the slots in the tool block assembly for retaining the suspension body when the tool block assembly comes into contact with the base;

a slider clamp movably mounted in the other of the slots in the tool block assembly for retaining the slider when the tool block assembly comes into contact with the base;

a spring mounted between the slider clamp and the suspension body clamp and the tool block assembly for biasing the slider clamp and the suspension body clamp toward the base; and wherein each of the suspension body clamp and the slider clamp is a flat member with an arcuate head on one end to compensate for rotational misalignment between the tool block assembly and the base, and at least one clamping point on an opposite end which is adapted to contact the suspension body and the slider, respectively.

4. The apparatus of claim 3 wherein the tool block assembly further comprises:

a top plate mounted to the bottom plate and having a cavity; and a backing plate mounted to the bottom plate for sealing the cavity in the top plate; and wherein the spring is located in the cavity.

5. The apparatus of claim 3, further comprising a series of slots and thin sidewalls in the tool block assembly for compensating for two directions of translational misalignment between the base and the tool block assembly.

6. The apparatus of claim 3, further comprising an actuator mounted to the tool block assembly for manipulating the slider clamp and the suspension body clamp.

7. The apparatus of claim 3, further comprising a crab leg assembly mounted in the tool block assembly which is adapted to engage and retain the suspension body during processing.

8. The apparatus of claim 3, further comprising at least one locating pin and at least one locating hole on each of the base and the tool block assembly for facilitating precision alignment therebetween.

9. An apparatus for processing an integrated lead suspension assembly having a suspension body and a slider, comprising:

a base having a platform which is adapted to support the suspension body and the slider;

a top plate having a cavity;

a bottom plate mounted to the top plate and having a pair of slots;

a backing plate mounted to the bottom plate for sealing the cavity in the top plate;

at least one locating pin and at least one locating hole on each of the base and the bottom plate for facilitating precision alignment therebetween;

a suspension body clamp movably mounted in one of the slots in the bottom plate for retaining the suspension body when the bottom plate comes into contact with the base;

a slider clamp movably mounted in the other of the slots in the bottom plate for retaining the slider when the bottom plate comes into contact with the base;

a spring mounted in the cavity of the top plate for biasing the slider clamp and the suspension body clamp toward the base; and wherein each of the suspension body clamp and the slider clamp is a flat member with an arcuate head on one end to compensate for rotational misalignment between them and the base, and at least one clamping point on an opposite end which is adapted to contact the suspension body and the slider, respectively.

10. The apparatus of claim 9, further comprising a series of slots and thin sidewalls in the bottom plate for compensating for two directions of translational misalignment between the base and the tool block assembly.

11. The apparatus of claim 9 further comprising a crab leg assembly having a symmetrical pair of vertical portions with a horizontal finger on each end, the vertical portions having inner and outer cam surfaces which engage inner and outer pins, respectively, mounted in the lower plate for moving the fingers between engaged and disengaged positions relative to the suspension body.

12. The apparatus of claim 9, further comprising an actuator mounted to the top plate for manipulating the slider clamp and the suspension body clamp.

13. The apparatus of claim 12, further comprising a crab leg assembly extending between the actuator and the base and being adapted to engage and retain the suspension body during processing.

* * * * *

UNITED STATES PATENT AND TRADEMARK OFFICE
CERTIFICATE OF CORRECTION

PATENT NO. : 6,088,912
DATED : July 18, 2000
INVENTOR(S) : King et al.

It is certified that error appears in the above-identified patent and that said Letters Patent is hereby corrected as shown below:

Title page, under column Attorney, Agent, or Firm, please delete "Dillion" and replace with --Dillon- -

Signed and Sealed this

Fifteenth Day of May, 2001

Attest:

NICHOLAS P. GODICI

Attesting Officer     Acting Director of the United States Patent and Trademark Office